United States Patent
Lee et al.

(10) Patent No.: US 7,052,036 B2
(45) Date of Patent: May 30, 2006

(54) PASSENGER AIRBAG MODULE FOR A MOTOR VEHICLE

(75) Inventors: Jung-Soo Lee, Kyunggi-do (KR); Ik-Hwan Kim, Chungcheongnam-do (KR); Byong-Ryong Cho, Kyunggi-do (KR); Gun-Woo Kim, Kyunggi-do (KR)

(73) Assignee: Hyundai Mobis Co., Ltd., Kyunggi-do (KR)

( * ) Notice: Subject to any disclaimer, the term of this patent is extended or adjusted under 35 U.S.C. 154(b) by 94 days.

(21) Appl. No.: 10/326,097

(22) Filed: Dec. 23, 2002

(65) Prior Publication Data

US 2004/0046371 A1 Mar. 11, 2004

(30) Foreign Application Priority Data

Sep. 5, 2002 (KR) .................. 10-2002-0053568

(51) Int. Cl.
*B60R 21/205* (2006.01)
*B60R 21/215* (2006.01)

(52) U.S. Cl. .................... 280/728.3; 280/732
(58) Field of Classification Search ............ 280/728.3, 280/731, 732
See application file for complete search history.

(56) References Cited

U.S. PATENT DOCUMENTS

| 5,588,669 | A | * | 12/1996 | Leonard et al. | ........... | 280/728.3 |
| 5,845,930 | A | * | 12/1998 | Maly et al. | ............... | 280/728.3 |
| 5,851,023 | A | * | 12/1998 | Nagata et al. | ............ | 280/728.3 |
| 5,865,461 | A | * | 2/1999 | Totani et al. | ............. | 280/728.3 |
| 5,887,891 | A | * | 3/1999 | Taquchi et al. | ........... | 280/728.2 |
| 6,010,146 | A | * | 1/2000 | Otsuka et al. | ............ | 280/728.2 |
| 6,050,597 | A | * | 4/2000 | Coleman | ..................... | 280/731 |
| 6,250,669 | B1 | * | 6/2001 | Ohmiya | ....................... | 280/732 |
| 6,296,270 | B1 | * | 10/2001 | Amamori | ................. | 280/728.2 |
| 6,299,202 | B1 | * | 10/2001 | Okada et al. | ............... | 280/732 |
| 2002/0153711 | A1 | * | 10/2002 | Bieber et al. | ............ | 280/728.3 |

* cited by examiner

*Primary Examiner*—Paul N. Dickson
*Assistant Examiner*—Laura B. Rosenberg
(74) *Attorney, Agent, or Firm*—Greenblum & Bernstein, P.L.C.

(57) ABSTRACT

An air bag door for a passenger seat of an automobile for improving a coupling construction of an air bag door and a housing. The air bag module for the passenger seat according to the present invention comprises inflators; a lower housing for receiving the inflators; an upper housing coupled to a top portion of the lower housing, for receiving an air cushion to be positioned upper the inflators; a pair of door retainers coupled with predetermined intervals to the inner sides of both longitude-directional lateral-walls of the upper housing; and an air bag door which covers an upper portion of the air cushion and is coupled with the upper housing, wherein in the both lateral-wall parts of the upper housing, a plurality of concavities are formed and arranged in a manner to be caved in by predetermined distances on each of the lateral-wall sides, and a plurality of coupling holes, which are coupled elastically with the concavities, are formed in both lateral-wall parts of the air bag door corresponding to the both lateral-wall parts of the upper housing. In accordance with the present invention, it is possible to significantly reduce weight and production cost of the air bag module, as well as easily couples an air bag door with a housing without separate external fixtures.

2 Claims, 5 Drawing Sheets

[FIG. 4]
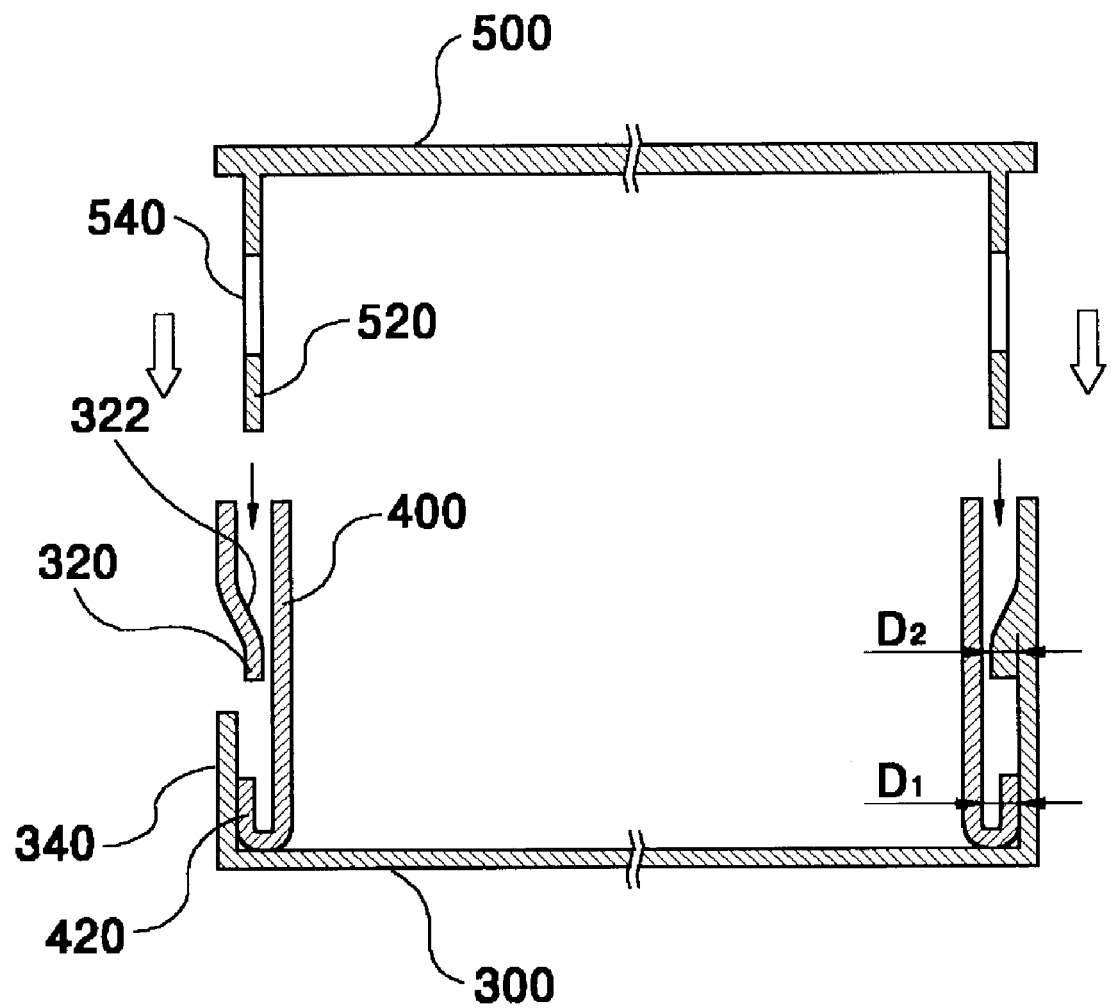

[FIG. 5]
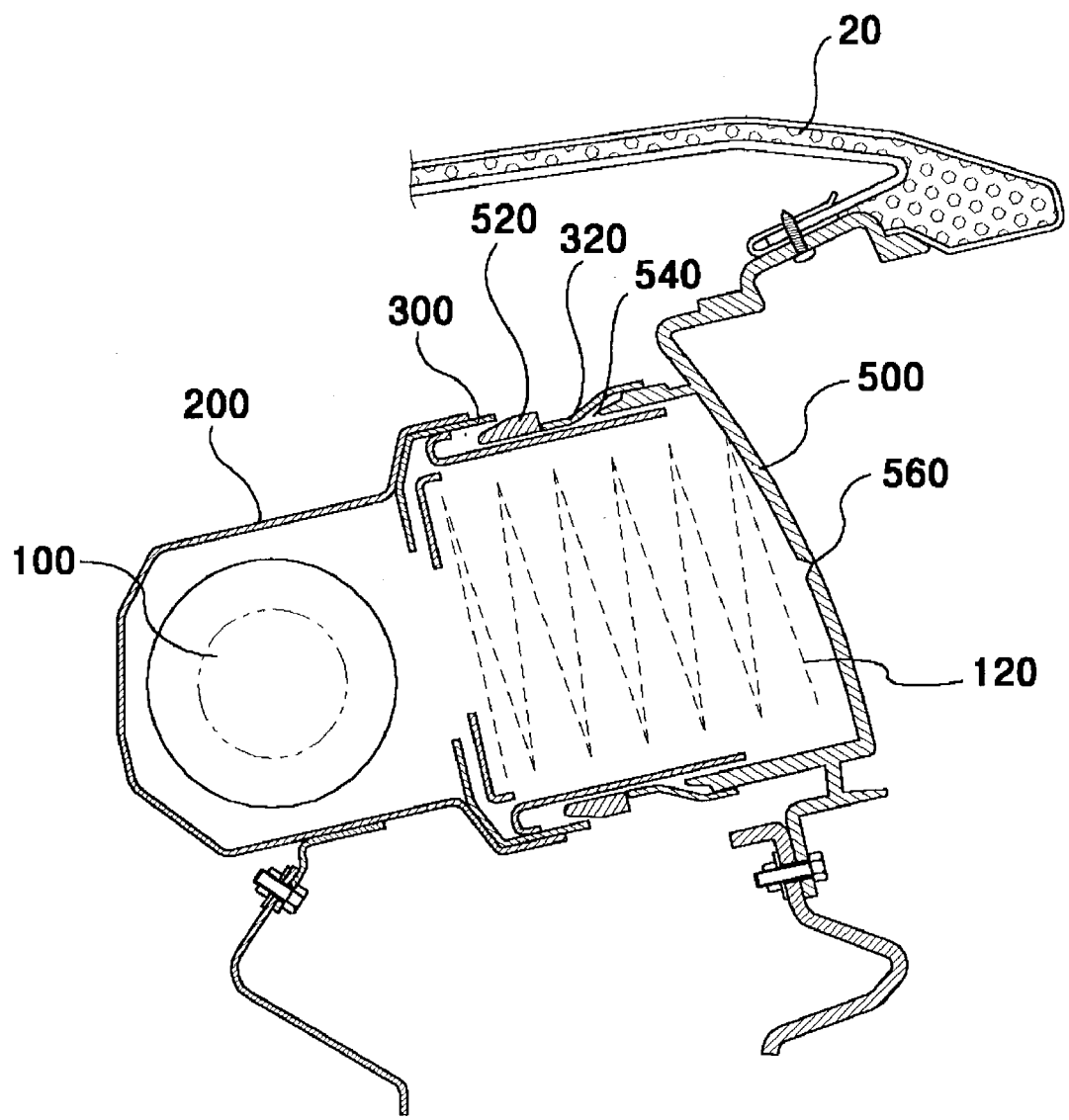

PASSENGER AIRBAG MODULE FOR A MOTOR VEHICLE

BACKGROUND OF THE INVENTION

1. Field of the Invention

The present invention relates to an air bag module for a passenger seat of an automobile, and more particularly to an air bag module for a passenger seat capable of improving a coupling construction of an air bag door and a housing to have a more compact structure than the structure when the air bag door and the housing are assembled together, thereby simplifying an assembly process, minimizing couplings of parts and decreasing the air bag module in weight.

2. Description of the Related Art

In general, an automobile includes various types of passenger protecting apparatuses, for example, such as a seat belt and an air bag system.

In the case that among these passenger-protecting apparatuses, particularly, the air bag system is used with the seat belt, it is prevented that when an automobile collision occurs, body members such as a head, a breast, knees, etc., of a passenger are hit and injured by constructions inside the automobile.

Among such air bag systems, an air bag system mostly mounted in a front seat of the automobile is generally distributed into a driver air-bag and a passenger air-bag.

FIG. 1a is a view showing a location at which a conventional air bag module for a passenger seat is mounted, and FIG. 1b is a perspective view showing in detail the air bag module for a passenger seat shown in FIG. 1a.

Referring to FIGS. 1a and 1b, a related air bag module 40 for a passenger seat is mounted on an instrument panel 20 upper a Glove Box 30 positioned in a passenger seat side of the automobile.

Within the housing 42 is installed inflators 41 for generating a desired compressed gas and in the upper part of the inflators 41 is received an air cushion (not shown) for inflating to a predetermined size by the compressed gas generated from the inflators 41.

Also, an air bag door 43 is coupled to the upper portion of the housing 42 in a manner to be opened by an expansivity when the air cushion is expanded.

In more detail, the inflators 41 are electrically connected with a collision sensor (not shown). In the case that when an automobile collision occurs, the collision is sensed through the sensor, the inflators 41 expand the air cushion by burning gas forming agent included therein and generating compressed gas.

The air bag door 43 is hinged on the housing 42 to be opened toward one direction by the expansivity upon the air cushion expansion, and is rotated with a center of a hinge part thereby being momentarily opened simultaneously with the expansion of the air cushion.

Also, the air bag door 43 is fixed on the upper outer surface of the housing 42 with bolts 45 and nuts 46 through a steel plate 44 as shown in the drawing, so that the air bag door 43 is not separated from the housing 42 upon a sudden expansion of the air cushion.

However, because such a conventional air bag module 40 for a passenger seat requires separate external fixtures such as the bolts 45, the nuts 46 and the plates 44, etc., for fixing the air bag door 43 when the air bag door 43 is assembled with the housing 42, there was a problem in a view of a productive aspect that many additional processes are required, which may increase cost of production. Further, there was a problem that the air bag module is increased in volume and weight due to the use of the separate external fixtures as well as the many hours of labor required, and an assembly capability of a product is deteriorated.

SUMMARY OF THE INVENTION

To solve the above-indicated problems, it is, therefore, an object of the present invention to provide an air bag module for a passenger seat of an automobile capable of significantly reducing weight and production cost of the air bag module as well as easily coupling an air bag door with a housing without separate external fixtures by forming coupling holes in the air bag door and forming concavities coupled elastically with the coupling holes in the housing.

To achieve the above object, an air bag module for a passenger seat according to the present invention comprises a lower housing for receiving inflators; an upper housing coupled to a top portion of the lower housing, for receiving an air cushion to be positioned upper the inflators; a pair of door retainers coupled with predetermined intervals to the inner sides of both longitude-directional lateral-wall parts of the upper housing; and an air bag door which covers an upper part of the air cushion and is coupled with the upper housing, wherein in the both lateral-wall parts of the upper housing, a plurality of concavities are formed and arranged in a manner to be caved in by predetermined distances on each of the lateral-wall sides, and a plurality of coupling holes, which are coupled elastically with the concavities, are formed in both lateral-wall parts of the air bag door corresponding to the both lateral-wall parts of the upper housing.

Further, the external surface of the concavities has inclined sections inclined with a predetermined slope along an assembly direction of the air bag door.

Also, the door retainer has bended sections curved outwardly at the lower portion thereof. These bended sections are fixed to the inner sides of the both lateral-wall parts of the upper housing by a welding.

BRIEF DESCRIPTION OF THE DRAWINGS

The above objects, features and advantages of the present invention will become more apparent from the following detailed description when taken in conjunction with the accompanying drawings, in which:

FIG. 1b is a perspective view showing in detail the air bag module for a passenger seat shown in FIG. 1a;

FIG. 4 is a cross-sectional view schematically showing the state that an air bag door is coupled with the upper housing in accordance with the present invention; and FIG. 5 is a cross-sectional view schematically showing the state that the air bag module for a passenger seat is mounted on an instrument panel in accordance with the present invention.

DETAILED DESCRIPTION OF THE PREFERRED EMBODIMENT

Figure 1A:
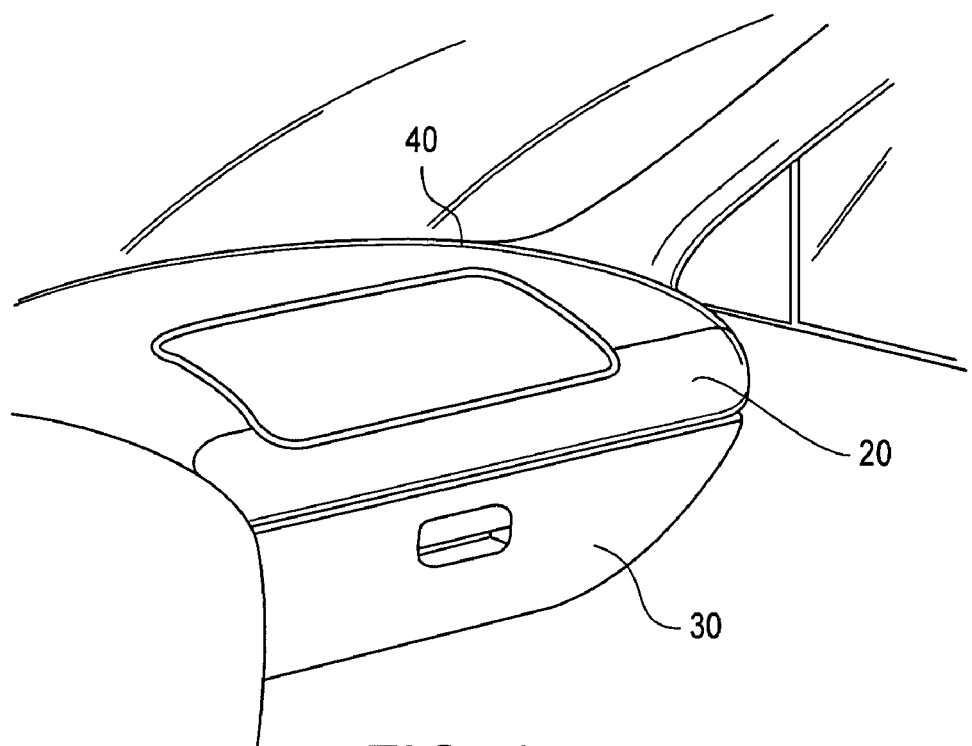
FIG. 1a is a view showing a location at which a conventional air bag module for a passenger seat is mounted.
Figure 1B:
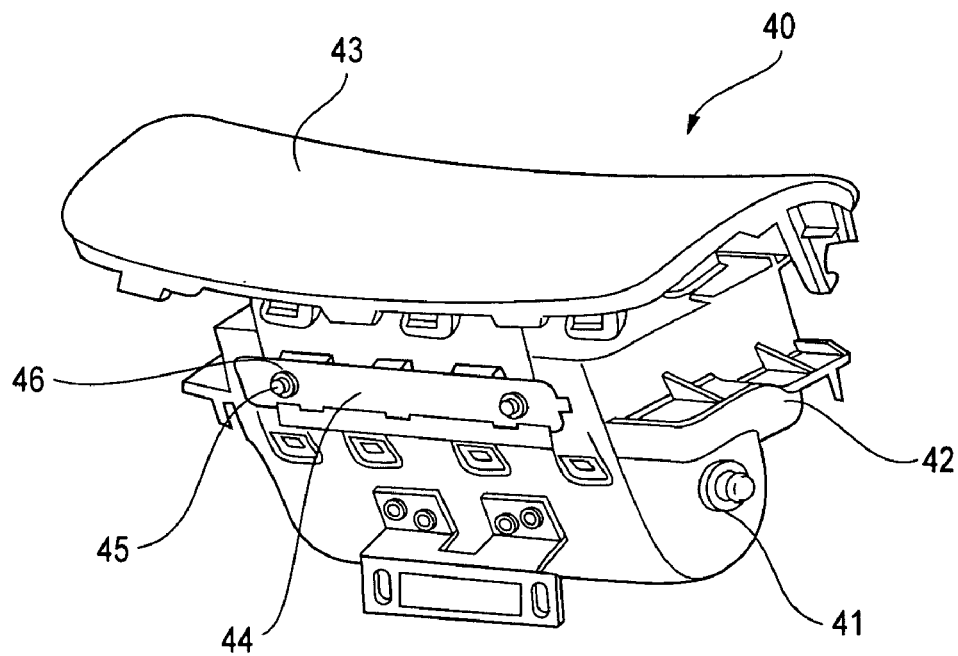

A preferred embodiment of the present invention will now be described with reference to the accompanying drawings.

In the following description, same drawing reference numerals are used for the same elements even in different drawings. The matters defined in the description such as a detailed construction and elements of a circuit are nothing but the ones provided to assist in a comprehensive understanding of the invention. Thus, it is apparent that the present invention can be carried out without those defined matters. Also, well-known functions or constructions are not described in detail since they would obscure the invention in unnecessary detail.

Figure 2:
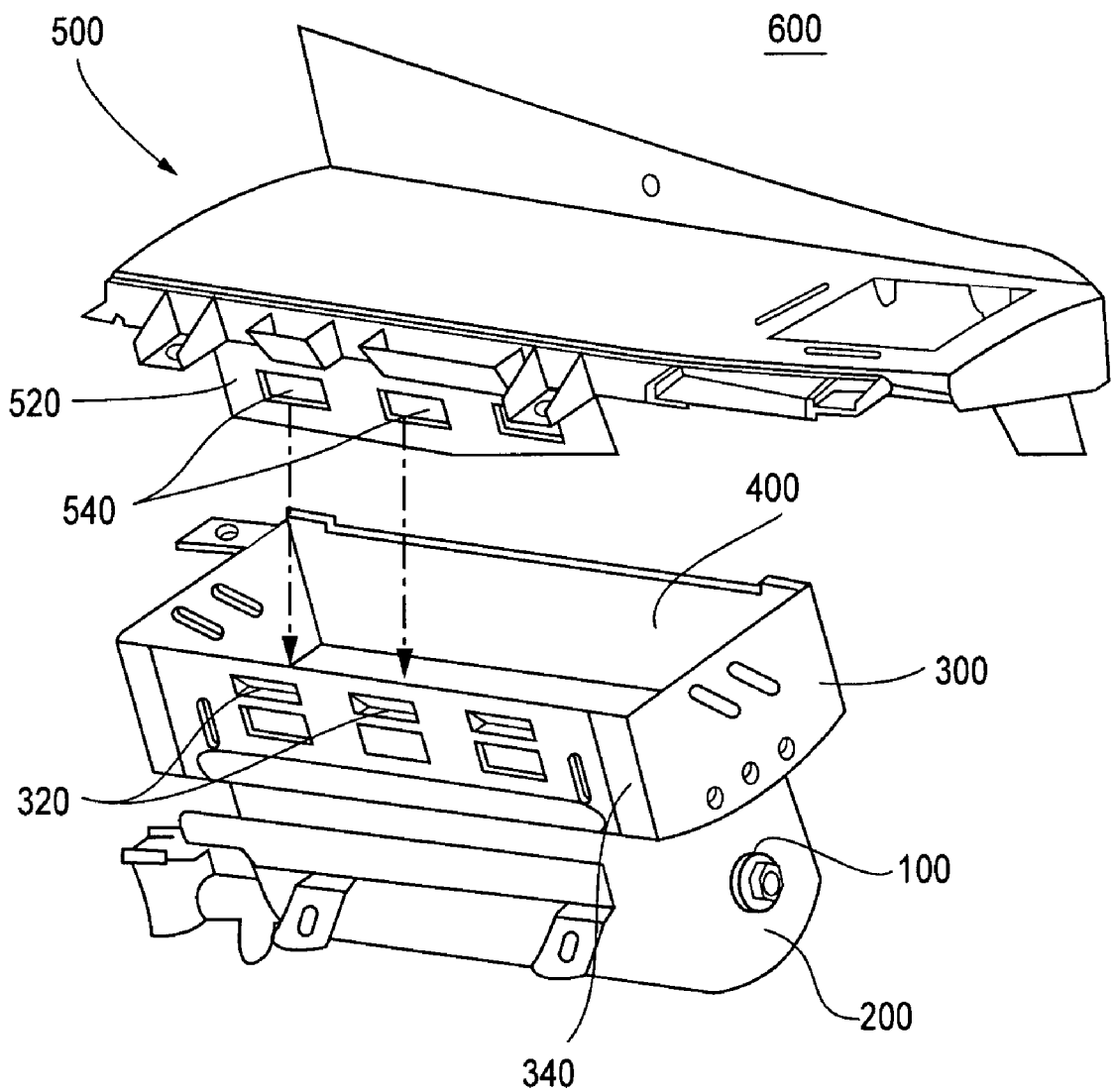
FIG. 2 is a perspective view showing an air bag module for a passenger seat in accordance with a preferred embodiment of the present invention.

FIG. 2 is a perspective view showing an air bag module for a passenger seat in accordance with the preferred embodiment of the present invention.

Referring to FIG. 2, the air bag module 600 for a passenger seat according to the present invention comprises inflators 100; a lower housing 200 for receiving the inflators 100, an upper housing 300 coupled to a top portion of the lower housing, for receiving an air cushion 120 (shown in FIG. 5) to be positioned above the inflators 100, and an air bag door 500 which covers an upper part of the air cushion and is coupled with the upper housing 300.

Also, the air bag module 600 for a passenger seat according to the present invention further comprises a pair of door retainers, which are coupled to the inner sides of both lateral-wall parts 340 of the upper housing 300, for fixing the air bag door 500 to the upper housing 300 upon the air cushion expansion.

The inflators 100 are electrically connected with a collision sensor (not shown) in an automobile. In the case that a collision is sensed through the sensor when an automobile collision occurs, the inflators 100 inflate the air cushion by burning gas forming agent therein and thereby generating compressed gas to flow it into the air cushion.

In addition, the lower housing 200 has the inflators 100 located within its closed inner space consisting of steel material, and the top portion of the lower housing 200 is opened so that compressed gas generated from the inflator 100 flows into the air cushion positioned thereon.

The upper housing 300 is an approximately rectangular box shape, which consists of steel material, having a bottom surface punched partially and an opened top portion. On lateral-wall surfaces of the upper housing 300 are formed a plurality of vent holes 350 for discharging compressed gas therein outwardly upon an inflator operation.

Particularly, a plurality of concavities 320 for coupling with the air bag door 500 are formed in both longitude-directional lateral-wall parts 340 of the upper housing 300.

Under these conditions, the concavities 320 are preferably formed above the vent holes 350. Door retainers 400 are coupled within the inner surfaces of the both lateral-wall parts 340 with predetermined intervals from the concavities 320.

On the other hand, an air bag door 500 generally consists of plastic material fabricated by an injection molding. In the inner part of the upper surface of the air bag door 500 is formed a breakable tear line 560 (shown in FIG. 5) having a predetermined shape.

A plurality of coupling holes 540, which are corresponding to the concavities 320 of the upper housing 300 and are opened inwardly and outwardly, are formed in the both longitude-directional lateral-wall parts 520 of the air bag door 500.

At this time, the coupling holes 540 are elastically coupled with the concavities 320 upon the air bag door assembly and then fix the air bag door 500 on the upper housing 300.

Figure 3:
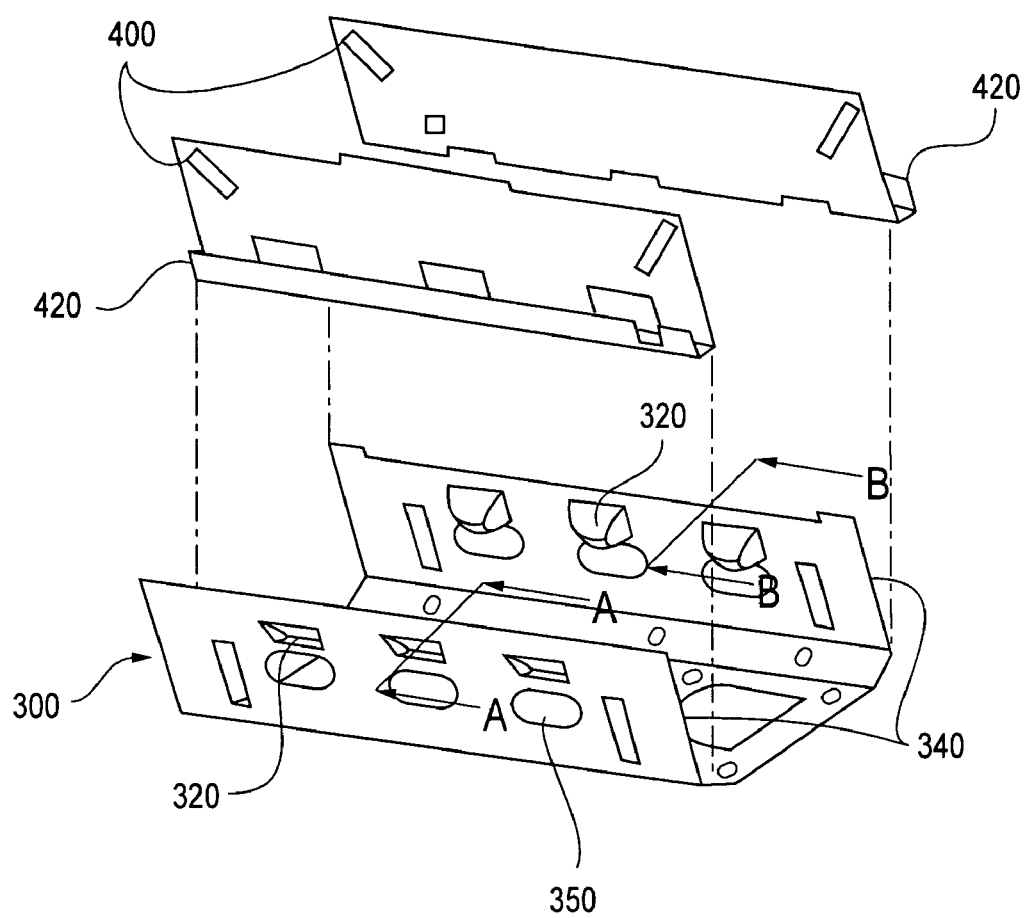
FIG. 3 is a perspective view showing a coupling construction of a door retainer and an upper housing shown in FIG. 2.

FIG. 3 is a perspective view showing in detail a coupling construction of the door retainer 400 and the upper housing 300 in the air bag module for a passenger seat 600 shown in FIG. 2, and FIG. 4 is a cross-sectional view showing in detail a coupling construction of the air bag door 500 and the upper housing 300 as shown in FIG. 2, wherein the left side of FIG. 4 is a cross-sectional structure taken along a line A—A of FIG. 3 and the right side thereof is a cross-sectional structure taken along a line B—B of FIG. 3.

As described in more detail with reference to FIGS. 3 and 4, the upper housing 300 has a plurality of vent holes 350 having predetermined shapes on the lateral-wall surfaces thereof in order to discharge compressed gas therein outwardly upon the operation of the inflator 100.

A plurality of concavities 320 are formed in the both longitude-directional lateral-wall parts 340 of the upper housing 300 in a manner to be caved in by predetermined distances on each of the lateral-wall parts 340.

The concavities 320 are molded at one time through a pressurization means such as a press from the outer side of the lateral-wall parts 340. At this time, the concavities 320 are preferably formed upper the vent holes 350 in order to facilitate the molding of the concavities 320.

Also, on the outer surfaces of the concavities 320 are formed inclined sections 322 having predetermined slopes along the assembly direction of the air bag door 500 and being curved gently.

The inclined sections 322 act on both lateral-wall parts 540 of the door to directly contact the inclined sections 322 upon the assembly of the air bag door 500 and thereby facilitate the lateral-wall parts to slide downward.

Also, as shown in the cross-sectional construction of FIG. 4, the door retainer 400 has bended sections 420 curved outwardly with an approximately hook shape at the lower portion thereof. The retainer 400 is fixed through the bended sections 420 to the inner side lower portions of the both lateral-wall parts 340 of the upper housing 300 by the welding.

At this time, a bended width $D_1$ of the bended section 420 is preferably formed to be approximately same as a protruded width $D_2$ of the concavity 320. In the case that the door retainer 400 is fixed to the upper housing 300, as shown in FIG. 4, the door retainer 400 is hold in a completely contacted state or in a tightly closed state to the outer surfaces of the concavities 320.

The door retainer 400 having the above fixed structure guides the movement of the both lateral-wall parts 520 of the air bag door 500 upon the assembly of the air bag door 500 and then makes the both lateral-wall parts 520 of the door to be tightly closed to the both lateral-wall parts 340 of the upper housing 300 in the inter-coupled state of the coupling holes 540 and the concavities 320 thereby preventing separation of the inter-coupled coupling holes 540 and concavities 320.

FIG. 5 is a cross-sectional view schematically showing the air bag module 600 for a passenger seat mounted on an instrument panel 20 in accordance with the present invention.

In FIG. 5, because a characteristic coupling construction of the present invention has been described above, the detailed description thereof will be omitted hereinafter.

Hereinafter, an operation of the present invention is described in detail.

Firstly, in accordance with the air bag module 600 of the present invention, upon the assembly of the air bag door 500 and the upper housing 300, the both lateral-wall parts 520 of the air bag door 500 are inserted into a spaced region between the upper housing 300 and the door retainer 400. Then, the air bag door 500 is pressed downward by a predetermined force.

Thus, the both lateral-wall sides 520 of the door 500 are slid downward while contacting with the outer surfaces of the concavities 320, that is, the inclined sections 322 and simultaneously is retreated temporarily while being subject to a compulsive elastic repulsive-force toward the inner direction by the concavities 320, and then is elastically returned again when the concavities 320 are coupled with the coupling holes 540, thereby performing the coupling with the concavities 320.

At this time, as the lateral-wall parts of the air bag door 500 moves downward in a tightly contacted state with the concavities 320, the door retainer 400 guides the movement, is elastically retreated temporarily toward a same direction as that of the lateral-wall sides 520, and is then returned again to maintain the tightly contacted state. Therefore, in a state of the complete coupling of the concavities 320 and the coupling holes 540, it is prevented for the concavities 320 and the coupling holes 540 to be separated from one another.

Simultaneously, when the air cushion is inflated due to an automobile collision, as the door retainer 400 temporarily makes the air bag door 500 to tightly contact to the upper housing 300 by the inflation pressure, it is prevented that the air bag door 500 is separated from the upper housing 300.

As apparent from the above description, the air bag door is assembled easily with the upper housing through elastic coupling of the concavities and the coupling holes, thereby increasing a work convenience.

Also, separate fixtures for coupling the air bag door and the housing are not required, thereby reducing parts required and accordingly minimizing weight and production cost of the air bag module.

In addition, the desired inclined sections are formed on the outer surface of the concavities and the both lateral-wall parts of the air bag door are slid elastically through the inclined sections upon the assembly of the air bag door, thereby facilitating the elastic coupling of the coupling holes and the concavities.

Further, the door retainer is spaced from the upper housing by the protruded widths of the concavities by forming the bended sections at the lower portions of the door retainer and fixing the bended sections through a welding at the lower portions of the lateral-wall parts of the upper housing.

According to this construction, upon the assembly of the air bag door, the both lateral-wall sides of the door are guided through the door retainer. In the state that the concavities are coupled completely with the coupling holes, the door retainer brings the both lateral-wall parts of the air bag door into tight contact with the upper housing not to be separated from one another. Likewise, when the air cushion is inflated, the door retainer also brings the air bag door into tight contact with the housing temporarily by the inflation pressure thereby preventing the separation of the door.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An air bag module for a passenger seat of an automobile, comprising:
    a lower housing configured to receive at least one inflator;
    an upper housing coupled to a top portion of the lower housing, the upper housing receiving an air cushion to be positioned on an upper portion of the inflator;
    an air bag door which covers an upper portion of the air cushion and is coupled with the upper housing; and
    first and second door retainers coupled to at least two inner sides of at least two lateral-wall parts of the upper housing, the first and second door retainers having first and second bent sections, respectively, configured to curve, at respective lower portions of the first and second door retainers, outwardly relative to a geometric center of the upper housing and relative to each other,
    wherein a plurality of concavities extend inwardly by a predetermined distance relative to a geometric center of the upper housing on each lateral-wall side in each of the lateral-wall portions of the upper housing,
    wherein a plurality of coupling holes, which are elastically coupled with the concavities, are disposed in each of at least two lateral-wall portions of the air bag door corresponding to the lateral-wall portions of the upper housing, and
    wherein the first and second bent sections have a width substantially equal to the predetermined distance.

2. The air bag module according to claim 1, further comprising:
    a plurality of vent holes in each lateral-wall side of the upper housing, wherein the concavities are proximate to respective vent holes.

* * * * *